(12) United States Patent
Baker

(10) Patent No.: US 7,155,747 B2
(45) Date of Patent: Jan. 2, 2007

(54) HEAD STABILIZING SYSTEM

(75) Inventor: Gregg S. Baker, Geneva, FL (US)

(73) Assignee: BHC Engineering, LP, Maitland, FL (US)

( * ) Notice: Subject to any disclaimer, the term of this patent is extended or adjusted under 35 U.S.C. 154(b) by 0 days.

(21) Appl. No.: 10/245,007

(22) Filed: Aug. 15, 2002

(65) Prior Publication Data

US 2003/0088906 A1    May 15, 2003

Related U.S. Application Data

(60) Provisional application No. 60/315,359, filed on Aug. 29, 2001, provisional application No. 60/312,754, filed on Aug. 17, 2001.

(51) Int. Cl.
*A42B 1/24* (2006.01)
(52) U.S. Cl. .............................. 2/422; 2/421
(58) Field of Classification Search ............... 2/421, 2/468, 425, 422, 6.1, 6.2, 411, 416, 6.6; 280/290, 280/801.1, 748; 297/464, 216.1, 393; 244/122 AG, 244/122 B
See application file for complete search history.

(56) References Cited

U.S. PATENT DOCUMENTS

| | | | |
|---|---|---|---|
| 3,497,872 A | 3/1970 | Mitchell | |
| 4,094,015 A | 6/1978 | Howard | |
| 4,274,161 A | 6/1981 | Littler | |
| 4,477,041 A * | 10/1984 | Dunne | 244/122 AG |
| 4,638,510 A | 1/1987 | Hubbard | |
| 5,272,422 A * | 12/1993 | Beaussant | 2/6.2 |
| 5,272,770 A | 12/1993 | Allen et al. | |
| 5,371,905 A | 12/1994 | Keim | |
| 5,581,816 A | 12/1996 | Davis | |
| 5,758,900 A | 6/1998 | Knoll et al. | |
| 6,009,566 A | 1/2000 | Hubbard | |
| 6,330,722 B1 * | 12/2001 | Betts | 2/416 |
| 6,428,043 B1 * | 8/2002 | Wooten | 280/748 |
| 6,810,535 B1 | 11/2004 | Moloney | |
| 2002/0043831 A1 * | 4/2002 | Alsup | 297/216.12 |
| 2004/0194194 A1 | 10/2004 | McNeil et al. | |

FOREIGN PATENT DOCUMENTS

| | | | |
|---|---|---|---|
| DE | 19517837 A1 * | 11/1995 | |
| FR | 2 700 746 | 7/1994 | |
| FR | 2 773 676 | 7/1999 | |
| GB | 2289615 A * | 11/1995 | |
| JP | 01254495 A * | 10/1989 | |

* cited by examiner

*Primary Examiner*—Rodney Lindsey
(74) *Attorney, Agent, or Firm*—Finnegan, Henderson, Farabow, Garrett & Dunner, LLP

(57) ABSTRACT

A head stabilizing system is provided. The head stabilizing system is intended to minimize loads on the head and the neck, some of which may be injurious or even fatal, by generating a reaction force that substantially opposes a force acting on the head and generated by rapid deceleration of a vehicle or a crash impact. The head stabilizing system includes a helmet, a connection structure, and at least one resisting member. The resisting member generates a reaction force that opposes the crash impact force, yielding a reduced net force on the head. This reaction force can be generated as a function of position, velocity or acceleration. The resisting member may include a tether, a dashpot, or a dashpot containing a controllable rheological fluid. The viscosity of the controllable rheological fluid can be automatically adjusted in response to changes in status of a vehicle or it's occupant.

21 Claims, 17 Drawing Sheets

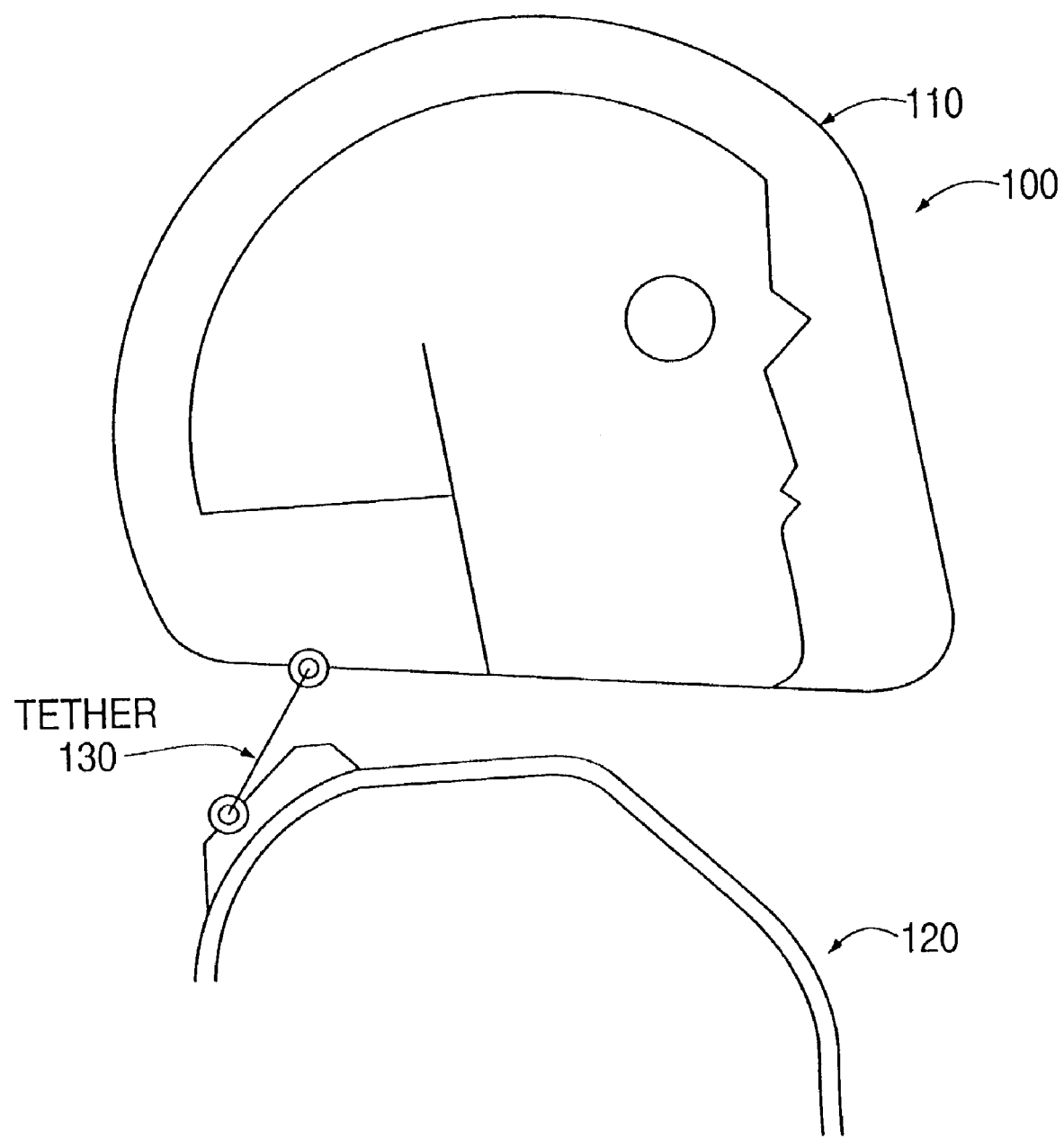

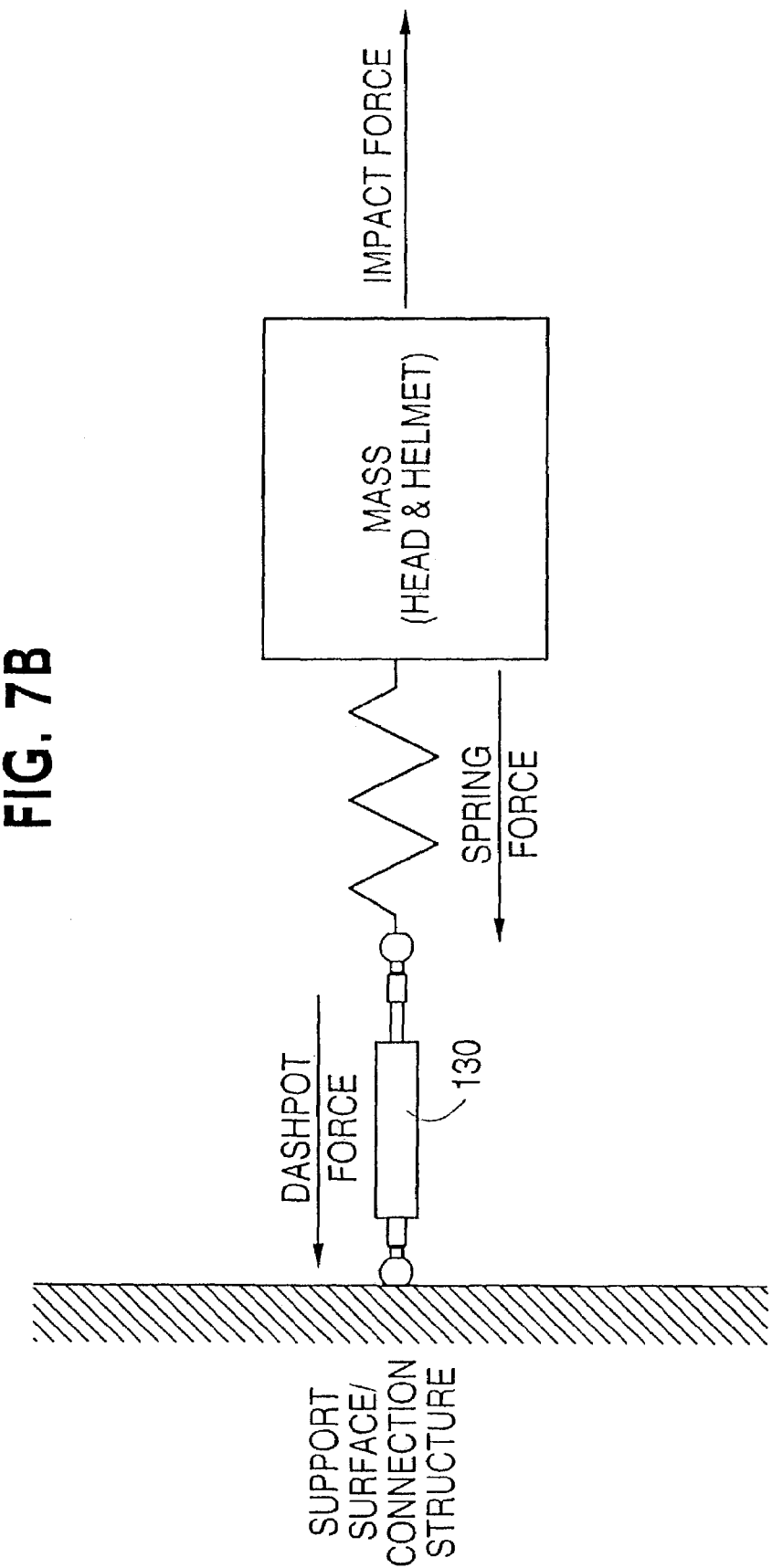

HEAD STABILIZING SYSTEM

This application claims priority under 35 U.S.C. §119 based on U.S. Provisional Application No. 60/312,754, filed Aug. 17, 2001, and U.S. Provisional Application No. 60/315,359, filed Aug. 29, 2001, the complete disclosures of which are incorporated herein by reference.

DESCRIPTION OF THE INVENTION

1. Field of the Invention

The present invention relates to a head stabilizing system for minimizing loads on the head and the neck, some of which may be injurious or even fatal, by generating a reaction force that substantially opposes a force acting on the head and generated by rapid deceleration of a vehicle or a crash impact.

2. Background of the Invention

Activities that involve high speed, such as racing cars or boats and flying aircraft, involve a large risk of a high speed crash. Such crashes involve rapid deceleration of the vehicle and the portion of its occupant connected, via seatbelt or harness, to the vehicle. However, the head and the neck of the occupant are generally not connected to the seat, and thus the head of the occupant accelerates rapidly with respect to the body, exerting a large force on the base of the skull, the neck muscles, ligaments, and the spinal cord of the occupant, and creating a large risk for severe head and neck injuries. Injuries caused by violent head movement were the most common cause of death among race car drivers during the last decade. When the head accelerates rapidly with respect to the body, large loads on the neck will occur, commonly resulting in basilar skull fracture, a condition in which the base of the skull cracks from stress, often causing trauma to arteries and the spinal cord.

Several head and neck protection devices have been developed to protect individuals from injury during rapid deceleration. For example, one device attaches a helmet to a yoke to be fitted around a wearer's shoulders. By attaching the helmet to the yoke around a user's shoulders, force is transferred away from the neck of the wearer through the device to the shoulder harness of a vehicle. Another device, disclosed in U.S. Pat. No. 5,371,905, limits motion of the head due to actuation of a valve achieved by attaining a minimum velocity of the head. Other devices include helmets attached to a wearer's yoke, to the seat or other fixed portion of the vehicle, or a network of webbing worn by the driver. Many of these devices restrict movement of the wearer during normal use, making the devices cumbersome and even dangerous to wear, due, for example, to their potential for limiting driver visibility, interference with control of the vehicle, or inhibiting the wearer's ability to exit the vehicle in the event of fire.

SUMMARY OF THE INVENTION

In accordance with the invention, a system for stabilizing the head during deceleration is provided, the system generates a reaction force that substantially opposes the force generated by the deceleration, yielding a reduced net force on the head.

According to one aspect of the present invention, a head stabilizing system for limiting the load acting on a wearer's head and generated by displacement, velocity, or acceleration of the wearer's head with respect to the wearer's body is provided. The system comprises a helmet, a connection structure, and at least one resisting member positioned between and connected to the helmet and the connection structure, wherein the at least one resisting member generates a reaction force that substantially opposes a crash impact force to yield a reduced net force on the head.

According to another aspect of the present invention, a head stabilizing system for limiting the load acting on a wearer's head and generated by displacement, velocity, or acceleration of the wearer's head with respect to the wearer's body is provided. The system comprises a resisting member having first and second ends, a helmet mount connector for connecting the resisting member to a helmet, the helmet mount being attached to the first end of the resisting member, and a movable harness connector for connecting a safety harness of a vehicle to the resisting member, the harness connector being attached to the second end of the resisting member.

According to a further aspect of the present invention, a head stabilizing system for limiting the load acting on a wearer's head and generated by displacement, velocity, or acceleration of the wearer's head with respect to the wearer's body comprises a helmet, and means for generating a reaction force that substantially opposes a crash impact force to yield a reduced net force on the head.

According to yet another aspect of the present invention, an automatically adjustable head stabilizing system for limiting the load acting on a wearer's head and generated by displacement, velocity, or acceleration of the wearer's head with respect to the wearer's body is provided. The system comprises a helmet, a connection structure, means for continuously monitoring a status of a vehicle and/or driver, and at least one dashpot containing a controllable Theological fluid, the at least one dashpot positioned between and connected to the helmet and the connection structure, wherein the viscosity of the rheological fluid in the dashpot automatically changes in response to or in anticipation of a change in a load being applied to the helmet and head of the wearer.

According to another aspect of the present invention, an automatically adjustable head stabilizing system for limiting the load acting on a wearer's head and generated by displacement, velocity, or acceleration of the wearer's head with respect to the wearer's body comprises a bladder positionable around a wearer's neck and containing a controllable rheological, wherein the viscosity of the rheological fluid in the bladder automatically changes based on changes in a load being applied to the head of the wearer.

According to a further aspect of the present invention, a method of automatically limiting the load acting on a wearer's head and generated by displacement, velocity, or acceleration of the wearer's head with respect to the wearer's body is provided. The method comprises providing an occupant of a moving vehicle with a system comprising a helmet, a connection structure, means for continuously monitoring a status of a vehicle and/or driver, and at least one dashpot containing a controllable Theological fluid, the at least one dashpot positioned between and connected to the helmet and the connection structure, wherein the viscosity of the rheological fluid in the dashpot automatically changes in response to or in anticipation of a change in a load being applied to the helmet and head of the wearer, continuously monitoring the status of at least one of the vehicle and the occupant, and automatically changing the viscosity of the rheological fluid in the dashpot in response to changes in the status.

According to yet another aspect of the present invention, a method of automatically limiting the load acting on a wearer's head and generated by displacement, velocity, or acceleration of the wearer's head with respect to the wearer's body includes providing an occupant of a moving vehicle with a system comprising a bladder positionable around a wearer's neck and containing a controllable rheological, wherein the viscosity of the rheological fluid in the bladder automatically changes based on changes in a load being applied to the head of the wearer, continuously monitoring the status of at least one of the vehicle and the occupant, and automatically changing the viscosity of the rheological fluid in the dashpot in response to changes in the status.

According to yet another aspect of the present invention, a head stabilizing system for limiting the load acting on a wearer's head and generated by displacement, velocity, or acceleration of the wearer's head with respect to the wearer's body comprises a helmet having an upper portion and a lower portion connected via a hinge, and at least one resisting member having a first end connected to the upper portion of the helmet and having a second end connected to the lower portion of the helmet, wherein the at least one resisting member generates a reaction force that substantially opposes a crash impact force to yield a reduced net force on the head.

Additional advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1C is a side view of an alternative embodiment of a head stabilizing device according to one aspect of the present invention;

FIGS. 7A and 7B are alternative force diagrams, including a spring, showing the forces used to calculate a damping coefficient according to the present invention;

DESCRIPTION OF THE EMBODIMENTS

Figure 1A:
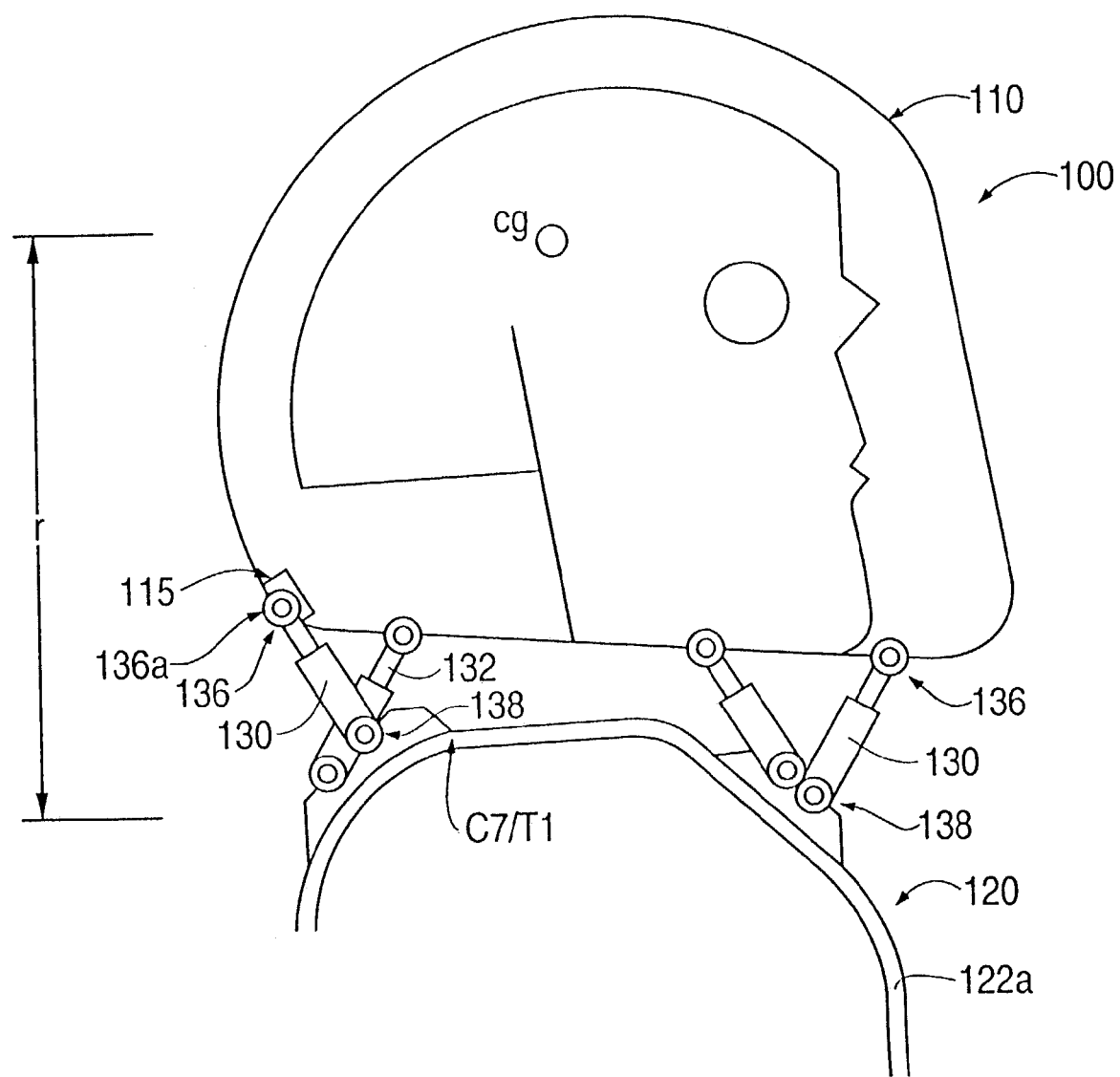
FIG. 1A is a side view of a head stabilizing system according to one aspect of the present invention.

Reference will now be made in detail to the present embodiment of the invention, an example of which is illustrated in the accompanying drawings. Wherever possible, the same reference numbers will be used throughout the drawings to refer to the same or like parts.

The present invention comprises a system for protecting the head and neck of the user during rapid deceleration. The system is intended to prevent any substantial increase or decrease in the distance between the head and the body when the head and body are moving at high velocity, for example, in a race car. The system includes at least one resisting member that generates a reaction force that substantially opposes a crash impact force, yielding a reduced net force on the head during a crash event.

When a wearer of a helmet or other protective device is in a rapidly moving vehicle, unless there is a crash, the velocity and acceleration of the wearer's head with respect to his body is very low. Specifically, the body and head are moving at the same speed within the vehicle, and any movement of the head with respect to the body is relatively slow, or at low velocity. However, in a crash situation, the wearer's body, which is strapped to the car, rapidly decelerates as the vehicle decelerates upon impact. The wearer's head, however, is not connected to the vehicle and continues to move at the same high velocity. Therefore, the head's velocity, with respect to the body, accelerates from approximately zero to an extremely high velocity almost immediately. For example, a race car crash can typically generate a force of approximately 50 times the pull of gravity in the driver's compartment, and generate a force approximately twice that, or approximately 100 times the pull of gravity, on the head itself. The entire crash event occurs in less than one tenth of a second, and peak head and neck loads occur in less than thirty milliseconds. This rapid acceleration of the head with respect to the body generates large loads on the head that may compress or stretch the neck, causing the distance between the head and the body to substantially change and resulting in severe injury or death. Other crash events generate different load patterns, but all result in rapid head acceleration relative to the body within a very short period of time. Thus, there are different requirements for a protective system depending upon the situation.

During normal use, i.e., in a non-crash situation where head velocity is low, it is important that the wearer is able to move his head freely—any movement of the head with respect to the body will be at a low velocity. This is particularly important to prevent interference with the wearer's visibility and control of the vehicle due to a limited or restricted range of motion. In a crash situation, because the head accelerates almost instantaneously to an extremely high value with respect to the wearer's body (which is strapped to the vehicle and decelerates with impact of the vehicle), it is important that the protective system be capable of offsetting the loads generated by the head moving at a high velocity with respect to the body in order to minimize injury.

The present invention allows low velocity motion of the head with respect to the body, reduces high velocity motion of the head with respect to the body, and generates a reaction force that offsets the loads generated by the rapid acceleration of the head with respect to the body. This is accomplished through the use of at least one resisting member. As used herein, a "resisting member" is a pivotable link between a helmet or other protective device and a connection surface. The link is capable of generating a reaction force that opposes the crash impact force, yielding a reduced net force on the head. This reaction force can be generated as a function of position, velocity or acceleration. The link is preferably sufficiently rigid, or is capable of becoming sufficiently rigid upon the absorption of kinetic energy, to substantially prevent relative movement between the helmet and the connection surface during deceleration (i.e., prevent any substantial increase or decrease in the distance between the head and body during a crash).

The resisting member may be, for example, a tether, defined herein as a substantially rigid link of a fixed length, such as a chain, a steel rod or cable, or nylon webbing. A tether generates a reaction force based on position, even while a crash is not occurring. Tethers are not especially preferred because their reaction is a function of position and, therefore, must necessarily restrain the head, even during normal, non-impact conditions, potentially severely limiting visibility of a driver due to the fixed length of the tether. In a more preferred embodiment, the resisting member may be a damping mechanism, for example, a damper, a dashpot, or a shock absorber. A dashpot generates a reaction force based on velocity. A dashpot's reaction force only occurs at a high velocity, allowing head motion at low velocities. Many of the embodiments described herein use a dashpot, although other suitable devices capable of generating a desired reaction force may be substituted.

At rest, the dashpot is a passive device and has substantially no force output. In motion, the damping force of the dashpot is, in general, approximately linearly proportional to the velocity of the piston and will oppose motion of the head with respect to the body.

To minimize injury to the head or neck of the wearer, it is desirable to minimize the load on the head and the neck such that it is no greater than approximately 3300 Newtons. When the body, strapped to the vehicle, stops moving upon impact, the head keeps moving. This causes both linear and angular acceleration of the head with respect to the body, resulting in a force acting on the upper neck. As discussed above, a crash generating a particular deceleration in the driver's compartment of the vehicle will cause approximately twice that deceleration to act on the upper neck. Both the linear and angular forces derive from Newton's second law of motion, which states that this force is defined as mass times acceleration, where the mass is that of the head and the acceleration is comprised of both linear and angular components. The linear component of the acceleration is the deceleration of the head of the occupant of the driver's compartment. The angular component of the acceleration is defined as $\omega^2 r$, where omega ($\omega$) is the angular velocity of the head about the point of relative motion, the bottom of the neck represented in FIG. 1A as the C7/T1 junction, and r is the radius, defined here as the distance from the bottom of the neck to the center of gravity of the head.

In a typical impact, loads on the head go from zero to peak to zero in about 0.05 seconds. Since the dashpot's damping coefficient is in units of force/distance/time, rapid motion requires more force. Thus, it is easy for the wearer to move the head slowly with respect to the body, i.e., under non-crash conditions, and extremely difficult to move the head quickly with respect to the body. In a crash, the force required for the head to accelerate from zero to peak velocity almost instantaneously is so high that the dashpots become virtually rigid thereby preventing any substantial increase or decrease in distance between the head and the body and substantially offsetting the load on the head and the neck.

As embodied herein and shown in FIGS. 1A–2B, 5A and 5B, a head stabilizing system 100 for protecting the head and neck of a user during rapid deceleration is provided. The system 100 includes a helmet, a connection structure, and at least one resisting member.

According to one aspect of the present invention, a helmet 110 is provided. The helmet 110 may be any standard helmet used by drivers or pilots for head protection. Preferably, the helmet 110 includes an outer shell and an inner shell. The outer shell preferably includes a rigid material such as hard plastic or a composite material. The inner shell preferably includes some sort of padding for additional protection of the head.

Helmet 110 also includes at least one mounting device for connecting the helmet 110 to at least one resisting member. As shown in FIGS. 1A and 5D–5F, the mounting device may comprise a bracket 115. The number and position of the mounting devices 115 is dependent upon and generally corresponds to the number and position of resisting members used, as will be described further below. It is envisioned that conventional helmets may be adapted for use with the system of the present invention by installing the appropriate mounting device(s) on the helmet.

According to another aspect of the present invention, a connection structure is provided. As embodied herein and shown in FIGS. 1A–1C, the connection structure may be a chest/shoulder plate 120. Chest/shoulder plate 120 includes a first shoulder portion 122a and a second shoulder portion 122b (not shown), which is substantially a mirror image of first shoulder portion 122a. Shoulder portions 122a, 122b may be made from any suitable material which can be shaped to form shoulder portions 122a, 122b, for example, a hard plastic or composite material. Shoulder portions 122a, 122b are configured to fit over the shoulders, adjacent the neck, of a user. Preferably, the shoulder portions 122a, 122b are curved to fit over the shoulders and may extend over the chest and back. The shoulder portions 122a, 122b may or may not be connected to one another.

Shoulder portions 122a, 122b may or may not be connected to a seat belt or harness. Shoulder portions 122a, 122b may further include a padded layer for added comfort. Shoulder portions 122a, 122b may also include mounting devices similar to those described for use with helmet 110.

Figure 2A:
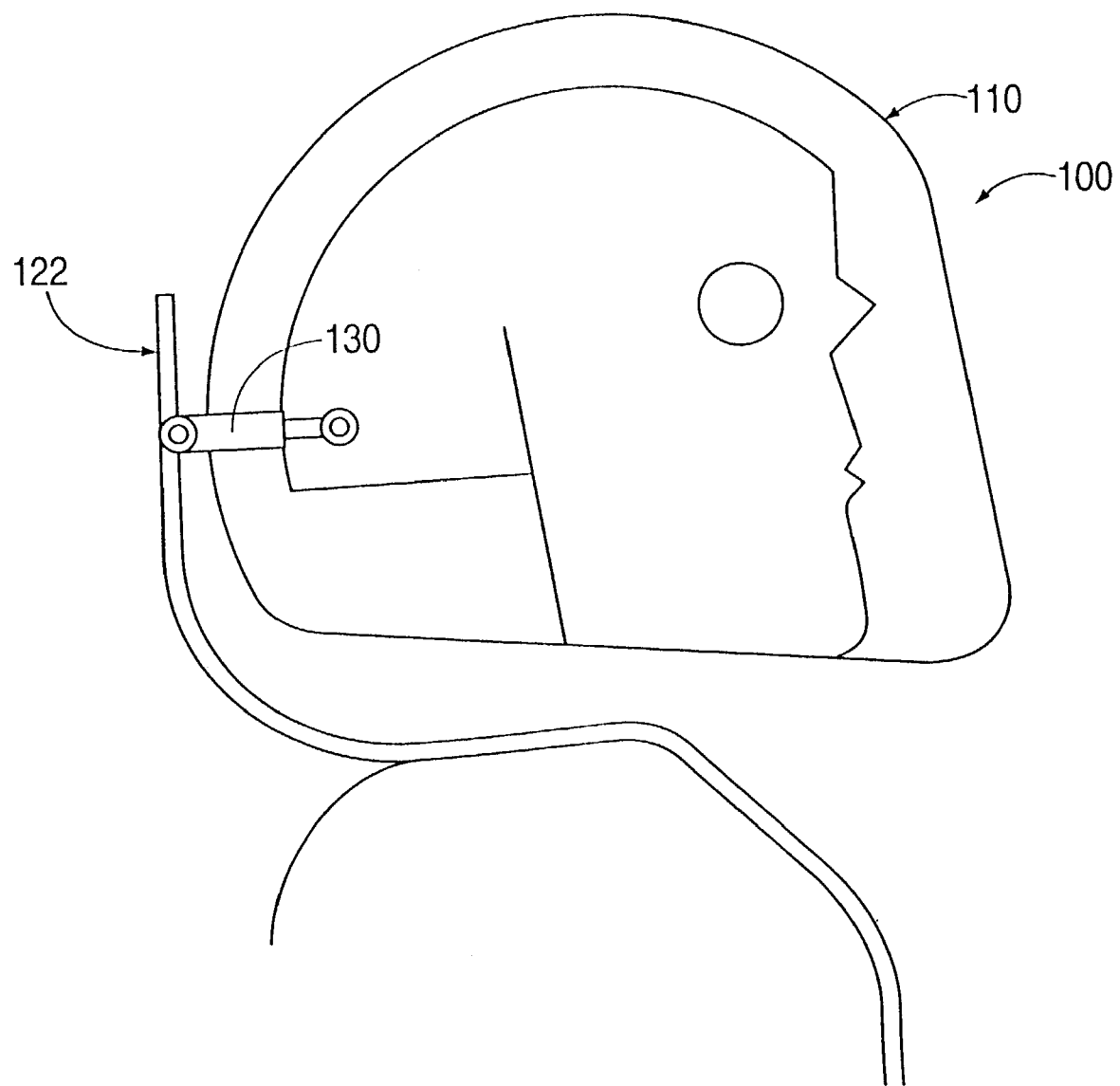
FIG. 2A is a side view of an alternative embodiment of a head stabilizing system according to another aspect of the present invention.

Alternatively, shoulder portions 122a, 122b may be connected to form a U-shaped yoke 122 (FIG. 2A). In such an embodiment, a collar portion intended to extend behind the neck connects the shoulder portions 122a, 122b, and shoulder portions 122a, 122b extend from the collar portion and over the chest of the wearer. Examples of such a helmet and shoulder restraint combination are disclosed in U.S. Pat. No. 4,638,510, issued Jan. 27, 1987, and U.S. Pat. No. 6,009,566, both of which are incorporated herein by reference.

In another embodiment, the helmet 110 may be attached to a connection structure other than a shoulder/chest plate. For example, the helmet may be attached to the seat of the vehicle, the roll cage of the vehicle, the frame of the vehicle, the shoulder harness 150 of the vehicle (FIGS. 5A and 5B), or a component worn by the driver such as a network of flexible webbing. Alternatively, a connection structure may not be provided, as described later with respect to FIG. 3.

Figure 4:
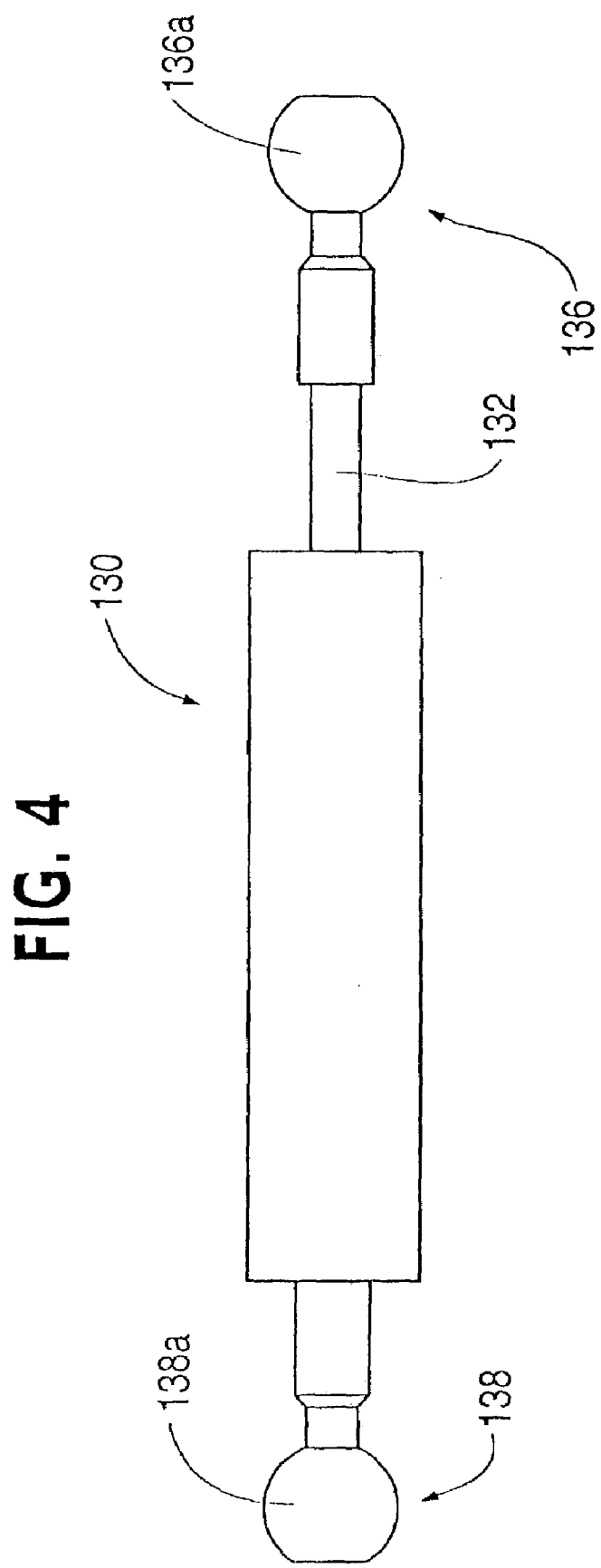
FIG. 4 is an isometric view of a damping mechanism used in the present invention.

As embodied herein and shown in FIGS. 1A–1C, 2A–2B, and 5A–5B, system 100 includes at least one resisting member. As shown in FIGS. 1A–1B, 2A–2B, and 5A, the resisting member may be a damping mechanism 130, such as a damper, dashpot or shock absorber, which contains a fluid, either gas or liquid. As embodied herein and shown in FIG. 4, a dashpot 130 comprises a piston 132, a low friction hollow cylinder 134, a first end 136 and a second end 138. Dashpot 130 may include an orifice that is adjustable to select the damping coefficient of the dashpot, although the orifice may be fixed to prevent tinkering. The piston 132 forces fluid through the orifice at a controlled rate to dissipate kinetic energy when the piston is being moved. Presently, a bi-directional dashpot, which works in both the pulling and the pushing direction, is preferred. By adjusting the rate at which fluid can be forced through the orifice (e.g., by changing the size of the orifice) the damping coefficient of the dashpot 130 can be selected. The damping coefficient should be selected to allow the dashpot to generate a reaction force to offset the force on the head and neck created by a crash.

As discussed earlier, the force that causes injury during impact is a result of the crash generating a particular deceleration in the vehicle that causes a deceleration of approximately twice that to act on the head and the upper neck. The actual value of the force generated during a crash can be estimated. Force is defined as mass times acceleration, where the mass is that of the head and the acceleration is comprised of both linear and angular components. The linear component of the acceleration is the deceleration of the head of the occupant of the driver's compartment. The angular component of the acceleration is defined as $\omega^2 r$, where omega ($\omega$) is the angular velocity of the head about the point of relative motion, the bottom of the neck represented in FIG. 1A as the C7/T1 junction, and r is the radius, defined here as the distance from the bottom of the neck to the center of gravity of the head.

According to established research (*Accidental Injury, Biomechanics and Prevention*, Alan M. Nahum and John W. Melvin, 1993), the external accelerations experienced by the human head during an accident are represented by a ramp-shaped function of as much as 160 times gravity and are felt for a duration of less than 50 milliseconds. The maximum allowable load on the neck before major injury occurs is approximately 3300 Newtons. Information such as the mass of the occupant's head and helmet is available, and for purposes of testing only, the inventor has assumed a total mass of approximately 15 lbs.

In order to minimize injury, the dashpot must generate a reaction force substantially equal to that generated by the crash, but acting in a direction opposite to the force exerted on the head and neck by the crash. By generating a substantially equal yet opposite force, the dashpot minimizes the net load acting on the head and neck, thereby minimizing the chance of injury. Using the above information regarding total mass and acceleration, the maximum allowed load on the head and neck, and the general duration of the crash event, it is possible to determine the damping coefficient of the dashpot necessary to generate the desired reaction force. Based upon the assumptions given above, the inventor has determined that a total damping coefficient of between about 4 and 15 lb/in/sec is preferred, with a total damping coefficient of about 8 lb/in/sec being most preferred, given typical mounting geometry. The damping coefficients of all dashpots within the system, added together, gives the "total damping coefficient." For example, for a total damping coefficient of 8 lb/in/sec, when two dashpots are used within the system, each dashpot would have a damping coefficient of about 4 lb/in/sec, and if 4 dashpots were used in the system, each dashpot would have a damping coefficient of about 2 lb/in/sec. Similarly, if only a single dashpot was used in a system, the dashpot would preferably have a damping coefficient of about 8 lb/in/sec.

It should be noted that dashpots having non-constant damping coefficients, or coefficients that differ in extension and in compression could be used as alternatives to the simple dashpots described herein. Also, design objectives that call for different impact loads, head and neck loads, or limitations to range of motion would result in a different range of damping coefficients and possibly different dashpot geometry.

Figure 1B:
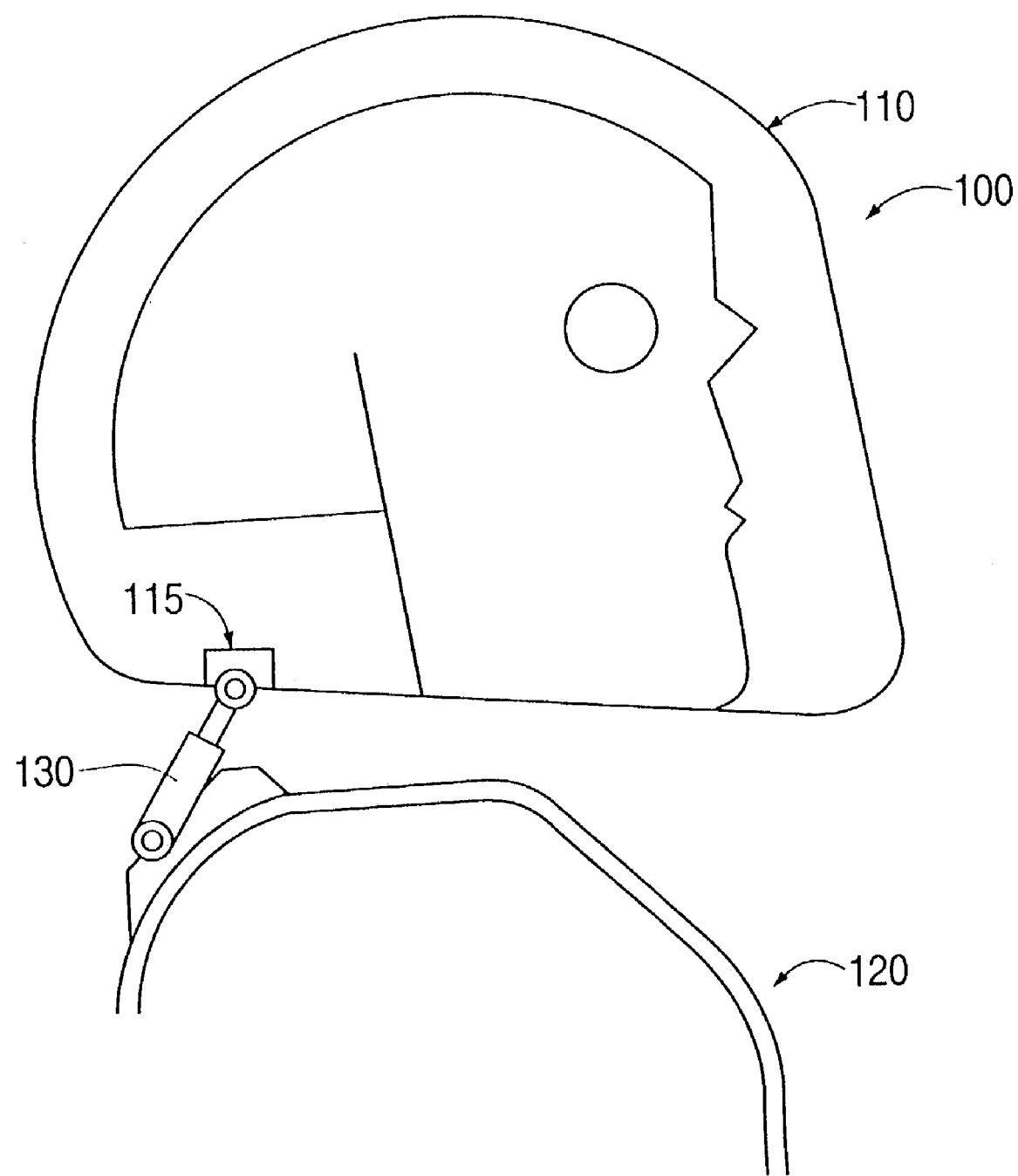
FIG. 1B is a side view of an alternative embodiment of a head stabilizing device according to one aspect of the present invention.

As shown in FIGS. 1A–1C, first ends 136 of resisting members 130 are connected to the helmet 110 by pivoting mechanisms such as ball joints 136a. Alternatively, as embodied herein and shown in FIG. 5C, resisting member 130 may include a helmet mount connector 160 for connecting the resisting member 130 to the bracket 115 on the helmet 110. Any suitable structure configured to fit with the bracket 115 may be used. Preferably, the helmet mount connector includes a quick release pin 162 to enable quick connection and release from the bracket/mounting device 115 on the helmet. Preferably, the helmet mount connector 160 is configured to connect to any helmet mounting device 115, thereby enabling more than one helmet to be used with the system. For example, a system 100 may be connected to a portion of a vehicle, such as the safety harness, and multiple drivers may utilize the system by connecting the helmet mount connector 160 to a mounting device 115 on their helmet.

Figure 5A:
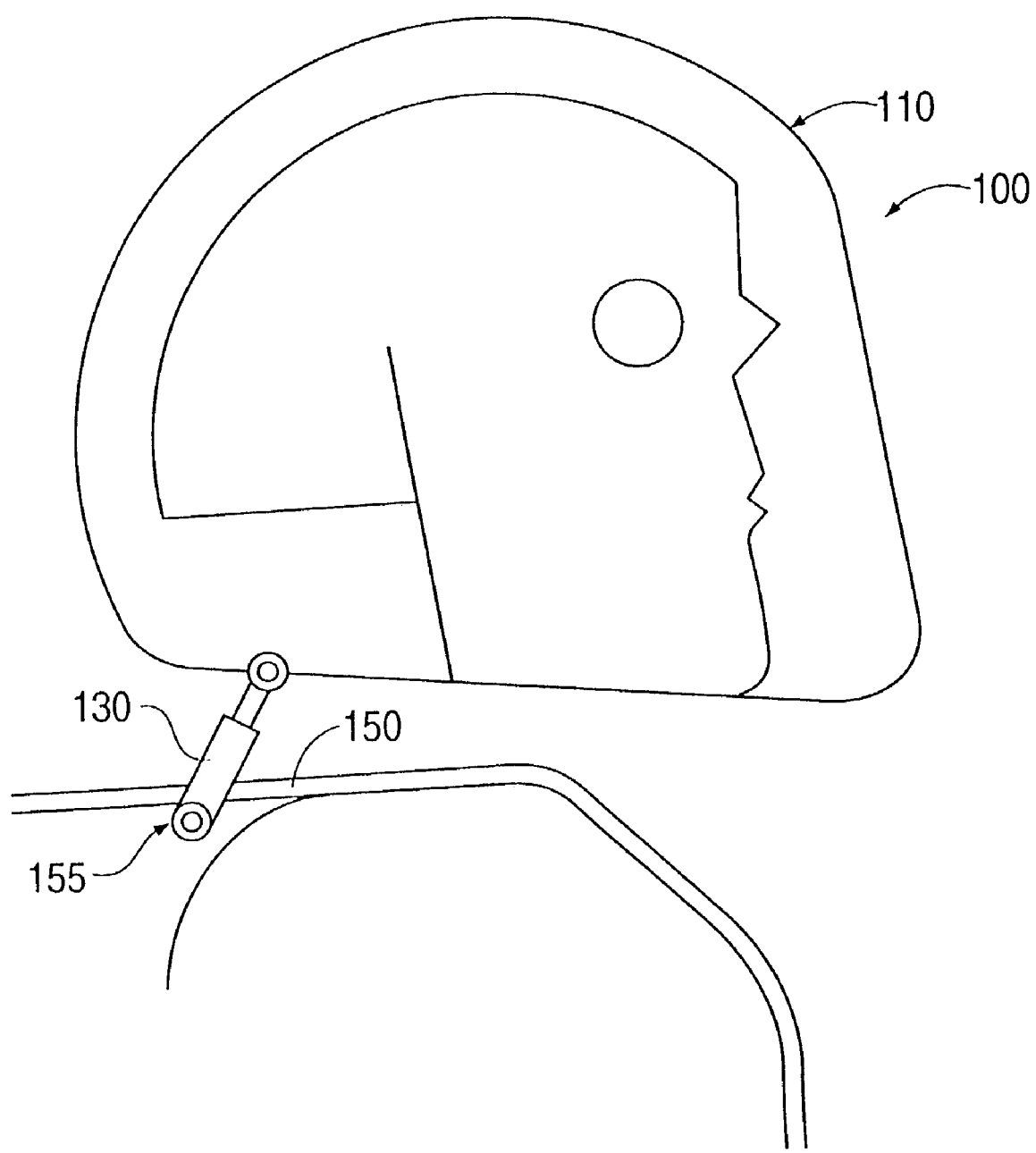
FIG. 5A is a side view of an alternative embodiment of a head stabilizing system according to another aspect of the present invention.
Figure 5B:
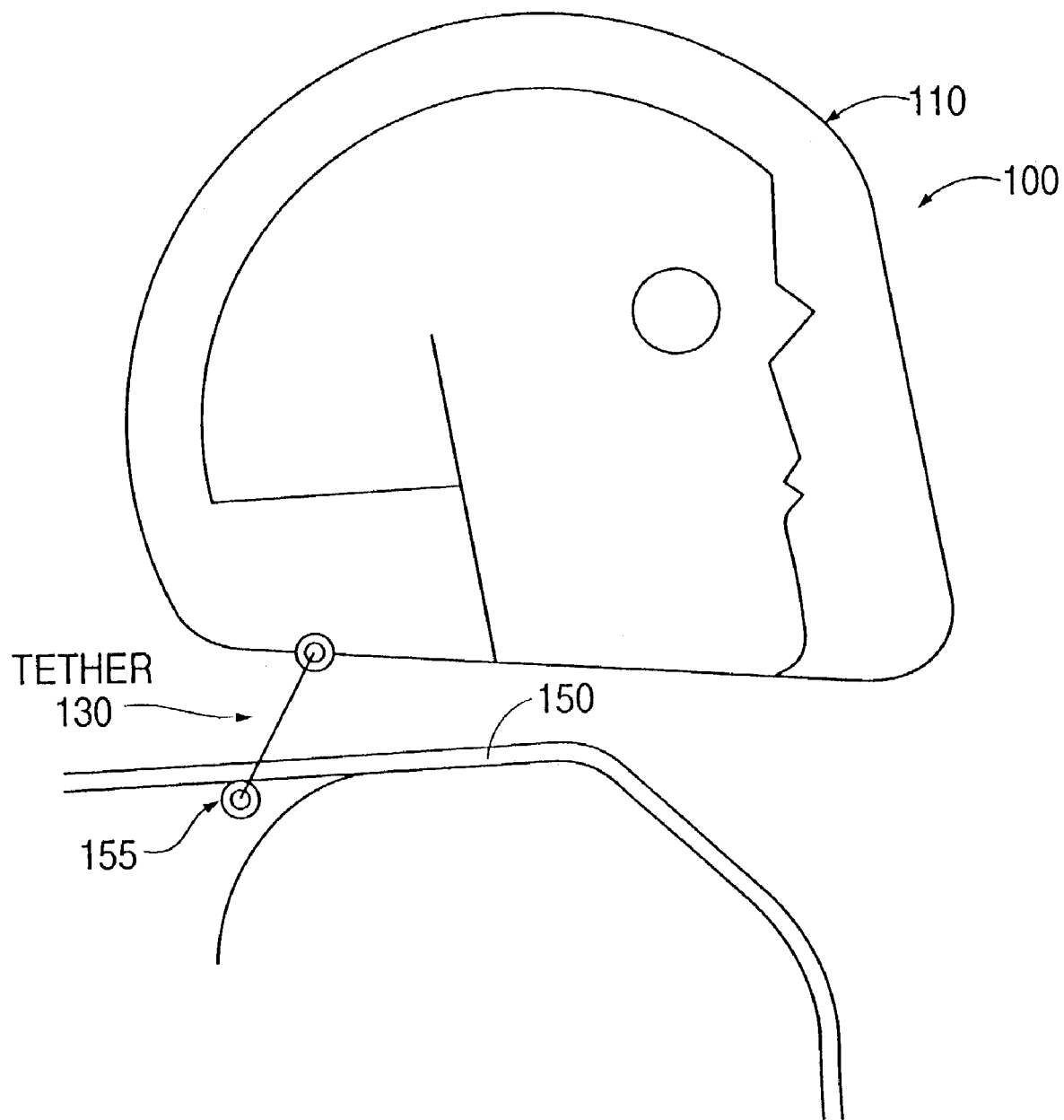
FIG. 5B is a side view of an alternative embodiment of a head stabilizing system according to another aspect of the present invention.

Second ends 138 of resisting members 130 are connected to shoulder/chest plate 120. Alternatively, the resisting member 130 may be connected to a portion of the vehicle, such as the safety harness 150 as shown in FIGS. 5A and 5B.

Figure 2B:
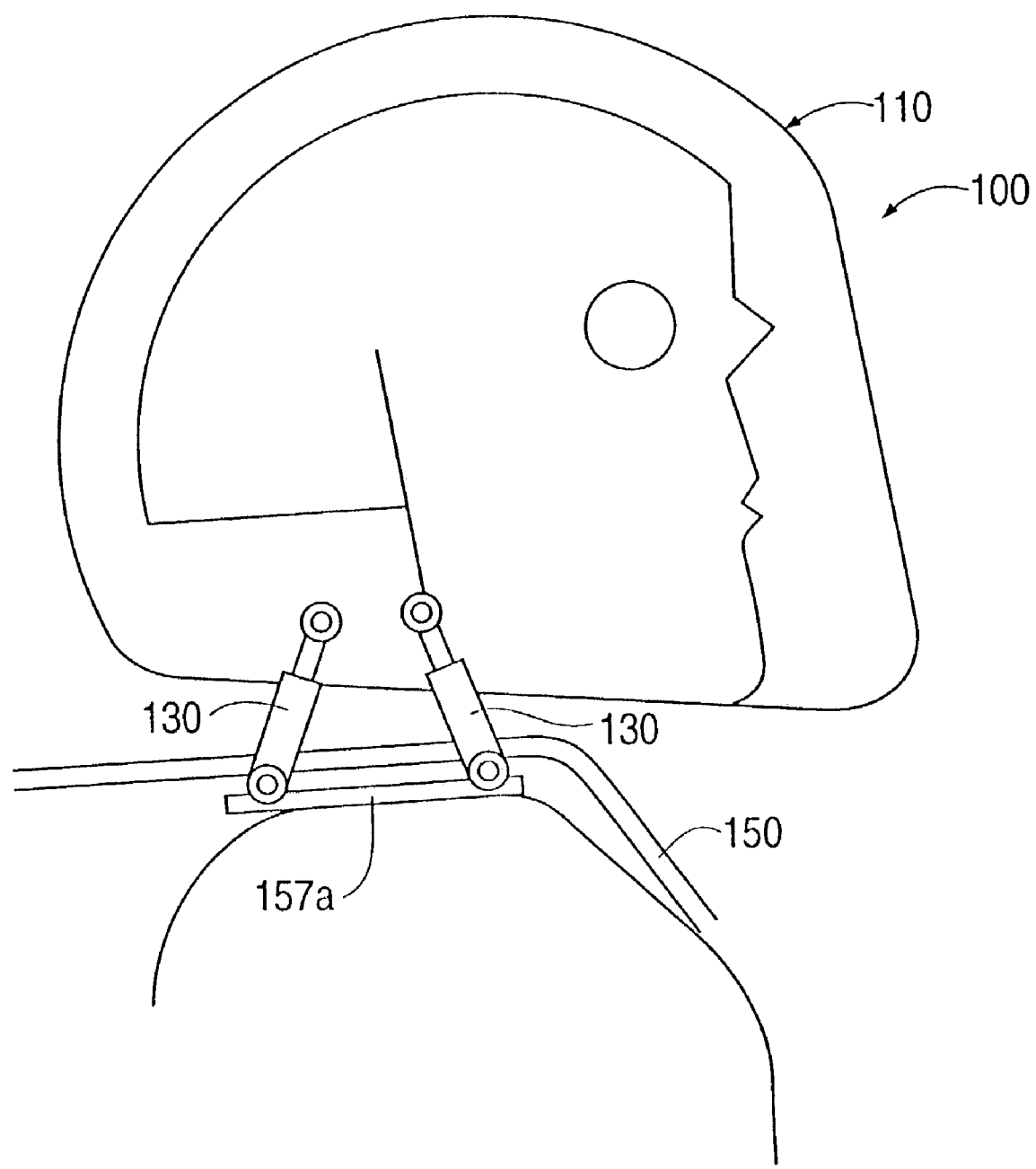
FIG. 2B is a side view of an alternative embodiment of a head stabilizing system according to another aspect of the present invention.
Figure 5C:
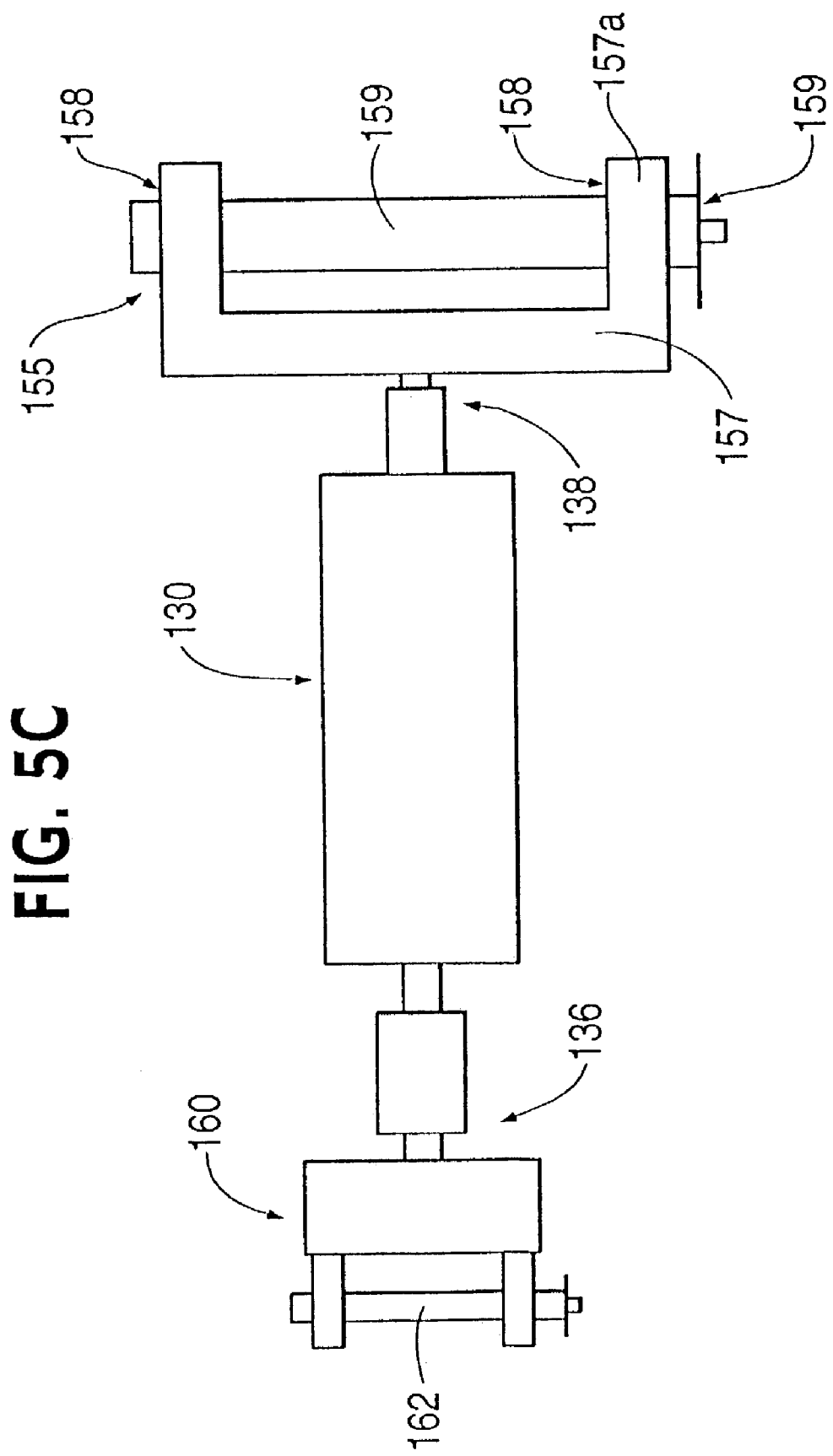
FIG. 5C is a top view of a damping mechanism and connectors according to one aspect of the invention.
Figure 5D:
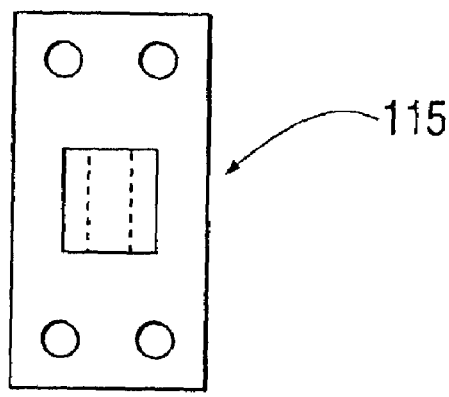
FIG. 5D is a top view of a mounting device for a helmet according to one aspect of the present invention.
Figure 5E:
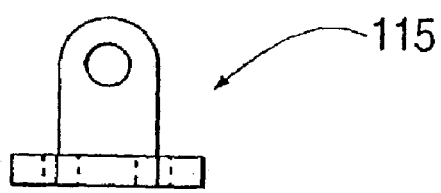
FIG. 5E is a side view of the mounting device of FIG. 5D.
Figure 5F:
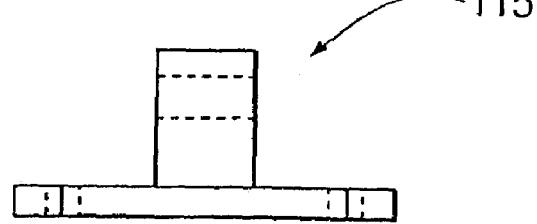
FIG. 5F is a front view of the mounting device of FIG. 5D.
Figure 5G:
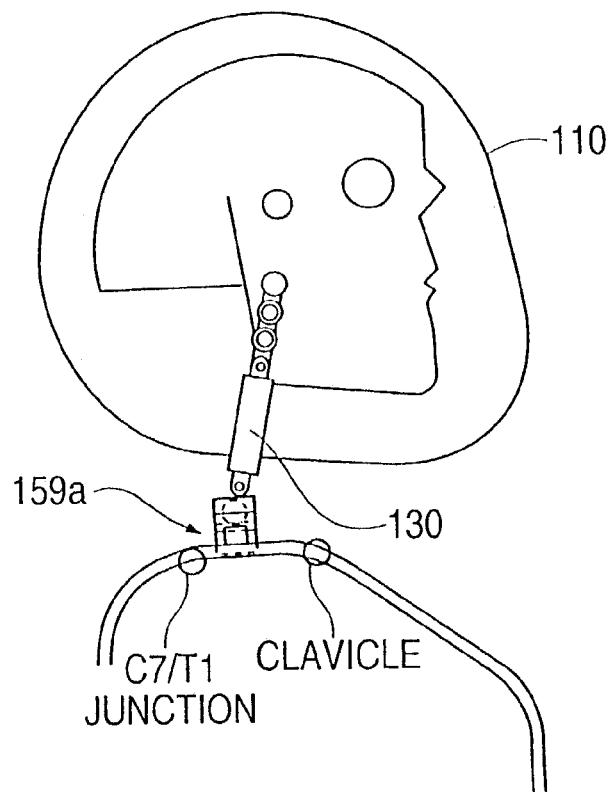
FIG. 5G is a side view of an alternative embodiment of a head stabilizing system according to another aspect of the present invention.
Figure 5H:
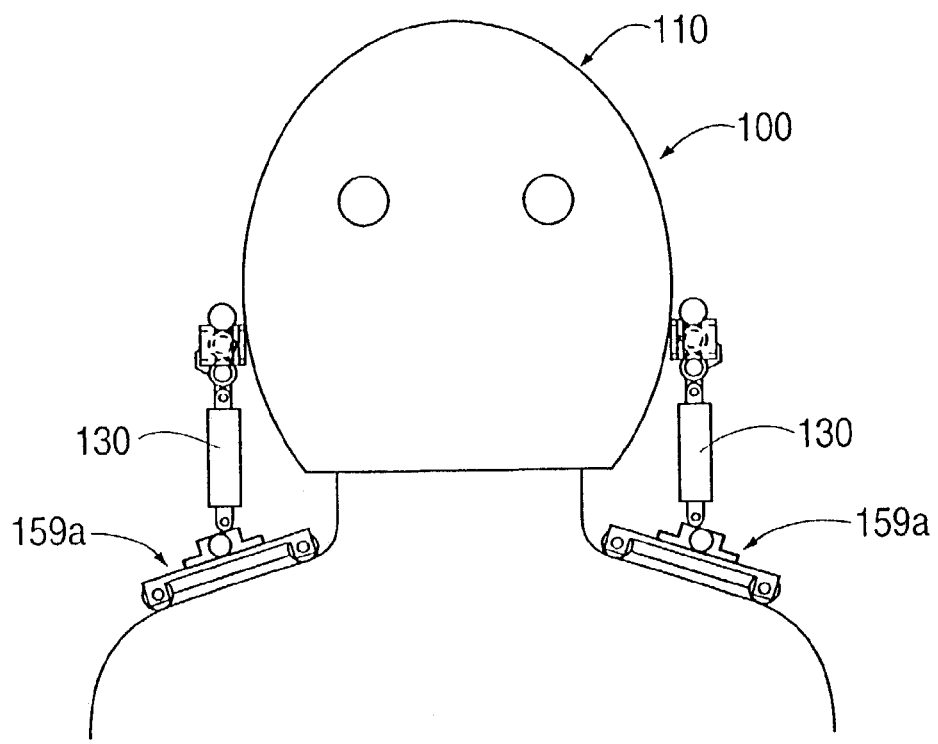
FIG. 5H is a back view of the head stabilizing system of FIG. 5G.
Figure 6:
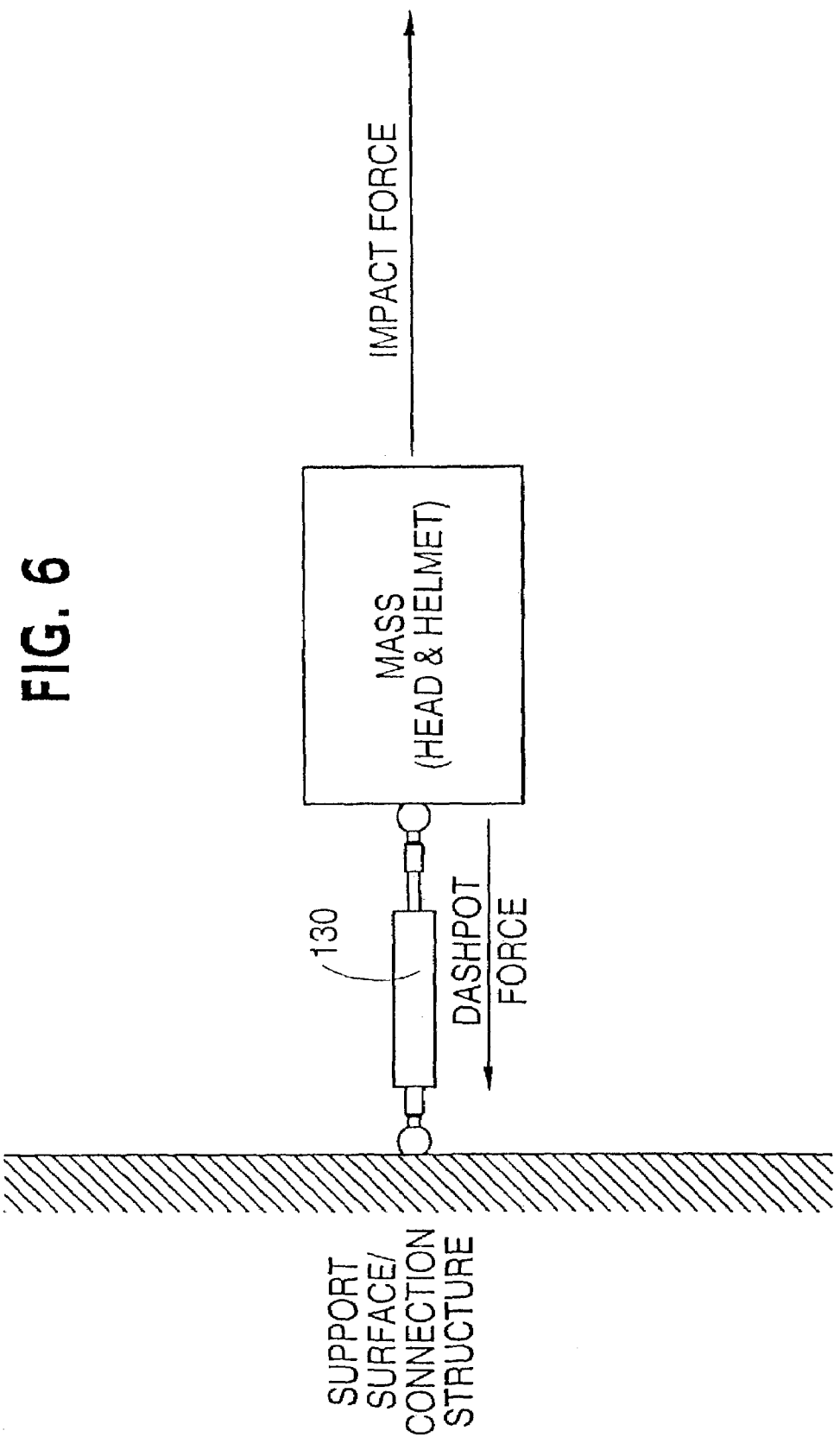
FIG. 6 is a force diagram showing the forces used to calculate a damping coefficient according to one aspect of the present invention.

As embodied herein and shown in FIG. 5C, resisting member 130 may be provided with a rolling harness connector 155. Rolling harness connector 155 includes a wide, squared U-shaped body 157 having holes 158 in legs 157a of the body. A quick release pin 159 for permitting attachment and detachment from the harness 150 passes through holes 158. A hollow support tube (not shown) may be placed over pin 159 to provide additional strength in anticipation of impact forces exerted on the pin. The safety harness 150 fits between the body 157 of connector 155 and pin 159. Pin 159 rolls on harness 150, allowing movement of the head with respect to the body when the resisting member is connected to the helmet 110. Alternatively, as shown in FIGS. 5G and 5H, the rolling harness connector 155 may be a sliding harness connector 155a. This harness connector 155a does not include a round pin for rolling, but may include a bar or other support, which slides below the safety harness. Similar to rolling harness connector 155, sliding harness connector 155a is intended to move with the driver in the event of a crash, rather than remain fixed on the safety harness 150. Alternatively, as shown in FIG. 2B, a structure 157a maybe be placed below/attached to safety harness 150. Such a configuration permits connection of two resisting members 130 to the structure 157a.

Using ball and socket type connections between helmet 110 and resisting members 130 and between resisting members 130 and shoulder/chest plate 120 allows freedom of movement of helmet 110 with respect to shoulder/chest plate 120, i.e., movement of helmet 110 is not restricted due to its connections to shoulder/chest plate 120. Piston rod length of the resisting member(s) 130 must be sufficient to allow for adequate motion of the head, such as tilting and turning the head.

As shown in FIG. 1A, four resisting members 130 may be used, two connected to each shoulder portion 122a, 122b. Alternatively, as shown in FIG. 1B, a single resisting member 130 may connect between the helmet 110 and shoulder/chest plate 120. As shown in FIGS. 1C and 5B, the resisting member 130 may be a tether instead of a dashpot. Alternatively, as shown in FIG. 2B, two resisting members 130 may be used, each connected to the structure 157a. In addition, two of the structures 157a may be provided, one under each shoulder harness, allowing the use of four resisting members. The number of resisting members 130 used and the type of connection structure used may vary, dependent upon a variety of conditions.

In use, during normal conditions, the head and body of the wearer are moving at the same velocity within the vehicle. Any movement of the wearer's head with respect to this body will normally be a small movement and will be relatively slow, such as turning the head to the side to look at a mirror. Since the dashpots' damping coefficient is in units of force/distance/time, slow motion requires relatively little force and the wearer is therefore able to move his head and helmet with respect to his body and connection structure. During a crash situation, the force required for the head to accelerate from zero to peak velocity almost instantaneously is so high that the dashpots become virtually rigid thereby generating a reaction force that substantially opposes the load generated by acceleration of the head with respect to the body and thus preventing any substantial increase or decrease in distance between the head and the neck that could cause severe injury.

According to another aspect of the invention, a head stabilizing system for protecting the head and neck of a user during rapid deceleration may not include a connection structure. As embodied herein and shown in FIG. 3, a system 200 includes a helmet having an upper portion and a lower portion and at least one resisting member connecting the upper portion of the helmet to the lower portion of the helmet.

Figure 3:
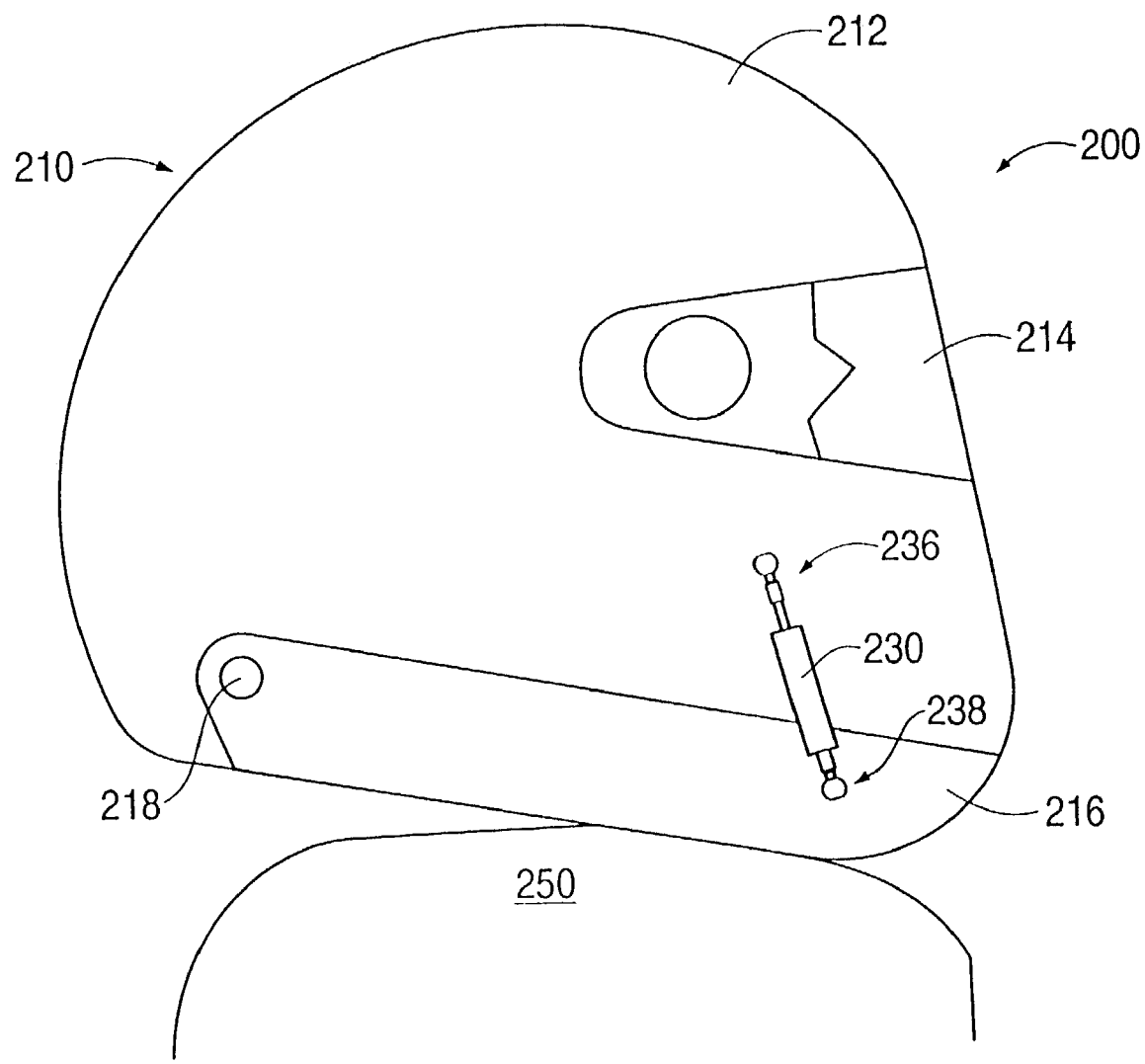
FIG. 3 is a side view of an alternative embodiment of a head stabilizing system according to another aspect of the present invention.

As shown in FIG. 3, a helmet 210 is provided. Helmet 210 may include an upper portion 212, a visor portion 214, and a lower portion 216. Goggles may replace visor portion 214. Upper helmet portion 212 is connected to lower portion 216 via hinges 218. Lower helmet portion 216 extends below the chin of the wearer and rests on the shoulders 250 of the wearer as shown in FIG. 3. Preferably, the helmet 210 includes an outer shell and an inner shell. The outer shell preferably includes a rigid material such as hard plastic or a composite material. The inner shell preferably includes some sort of padding for additional protection of the head.

As embodied herein and shown in FIG. 3, resisting members are provided. The resisting members preferably comprise dashpots 230. Dashpots 230 have the same structure and function as described previously with respect to the embodiment of FIGS. 1A–1B, 2A–2B, and 5A. Dashpots 230 include a first end 236 and a second end 238. First ends 236 are connected to a lower surface of the upper helmet portion 212 and second ends are connected to an upper surface of the lower helmet portion 216. Alternatively, the hinges 218 may be replaced with rotational dashpots.

In use, during normal conditions, the head and body of the wearer are moving at the same velocity within the vehicle. Any movement of the wearer's head with respect to this body will normally be a small movement and will be relatively slow, such as turning the head down to look at a gauge. Since the dashpots' damping coefficient is in units of force/distance/time, slow motion requires relatively little force and helmet portions 212, 216 move freely with respect to one another, allowing the wearer to move his head with respect to his body. During a crash situation, the force required for the head to accelerate from zero to peak velocity almost instantaneously is so high that the dashpots 230 become virtually rigid. The rigidity of the dashpots 230 generates a reaction force substantially opposing the load generated by the rapid acceleration of the head with respect to the body and thus prevents any substantial increase or decrease in the distance between the head and the body that could cause severe injury.

Figure 7A:
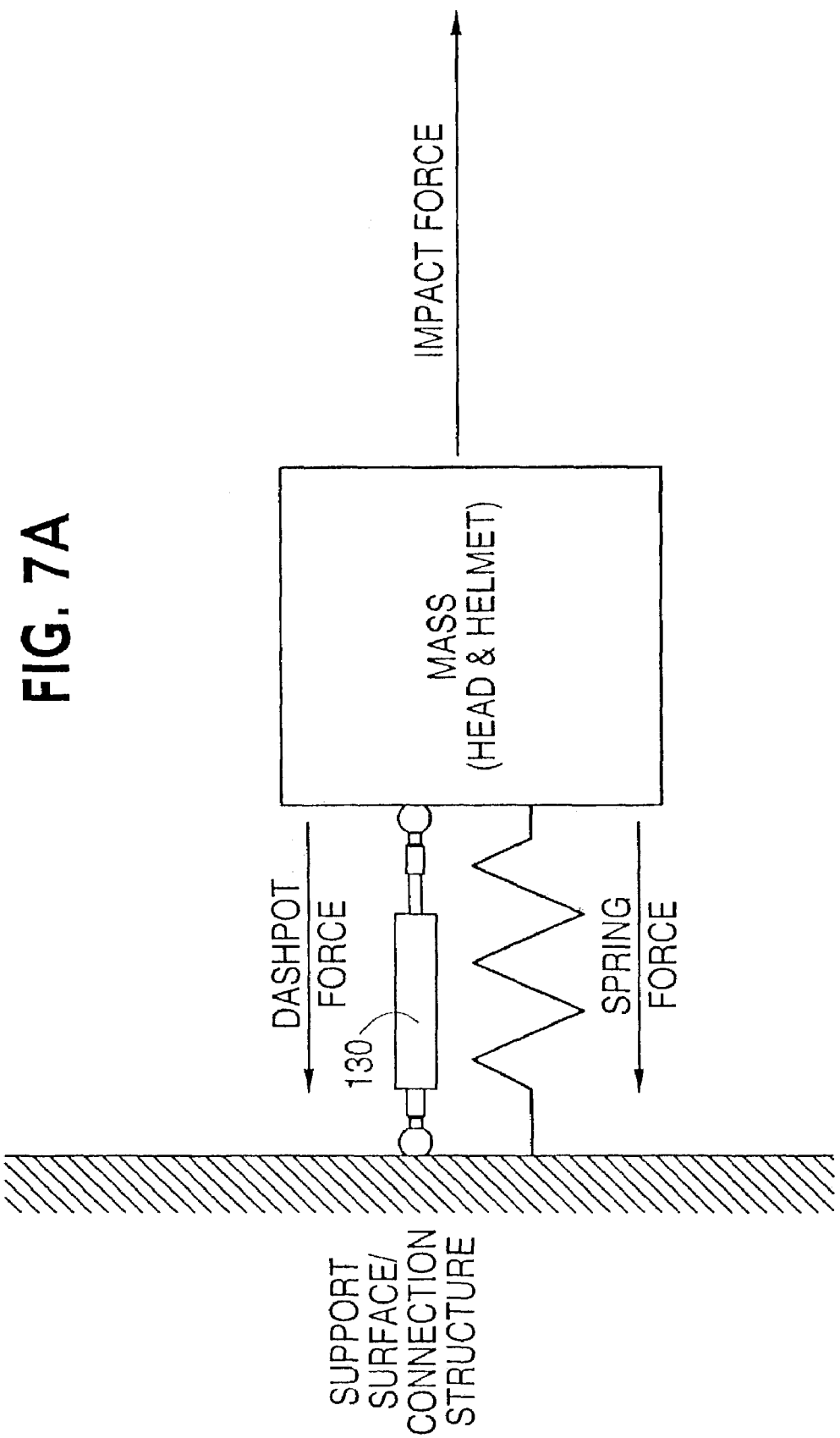

The dashpots used in the above embodiments may be linear dashpots. Alternatively, in a preferred embodiment, the dashpots used are radial, or universal, dashpots. Universal dashpots are able to control motion in all directions. Use of such dashpots would be useful in situations where the force applied is not a linear force or is not applied from a head-on crash. For example, in helicopter crashes, injury is due to a compressive load on the spine and displacement of the neck. Alternatively, if a car is side-swiped, the force may be horizontal. By using a universal dashpot, all of these types of loads can be counteracted. In an extreme situation such as providing protection for a wearer in a helicopter crash or very high impact racing crash, it may also be desirable to include a spring in addition to the dashpot, as shown in FIGS. 7A and 7B.

A primary goal of the present invention is to prevent injury to the wearer in impact or crash situations. However, it is also desirable to prevent minor injuries, such as those caused by the forces created in "normal" situations, such as taking corners at extremely high speeds, braking, or flying in a fighter aircraft. Such "normal" activities may generate forces in the range of approximately 3 to 10 g, which can cause strain and/or injury to the neck. The present invention provides a system capable of automatically adjusting to counteract the forces applied in any situation. Thus, if a wearer is taking a corner at high speed, the device will become sufficiently rigid to prevent injury and reduce fatigue at that load. If a wearer is in a crash, the device will become sufficiently rigid to minimize injury at impact. This is accomplished by replacing the dashpot in the previous embodiments of FIGS. 1A–5A with an automatically adjustable damping mechanism. The fluid-based dashpot preferably includes a controllable rheological fluid such as a magneto-rheological (MR) fluid or an electro-rheological (ER) fluid. Although this embodiment is discussed with respect to a MR fluid-based dashpot, it is envisioned that an ER fluid-based dashpot could be substituted.

MR fluid changes viscosity dependent upon the magnitude of an applied magnetic field—the larger the magnetic field applied, the greater the change in viscosity of the fluid. ER fluid changes viscosity dependent upon the magnitude of an applied charge—the larger the charge applied, the greater the change in viscosity of the fluid. This change can occur in a few milliseconds. These fluids have been incorporated in a dampening mechanism by the inventor of the MR fluid or Rheonetic™ fluid technology, Lord Corporation. The present invention incorporates a controllable rheological fluid, such as the MR fluid, into the automatic head stabilizing system.

According to one aspect of the present invention, an automatic head stabilizing system for protecting the head and neck of a user during rapid deceleration is provided. The system 300 includes a helmet 310, a connection structure, at least one MR fluid dashpot 330, and means for monitoring the status of the vehicle and/or driver.

Figure 8:
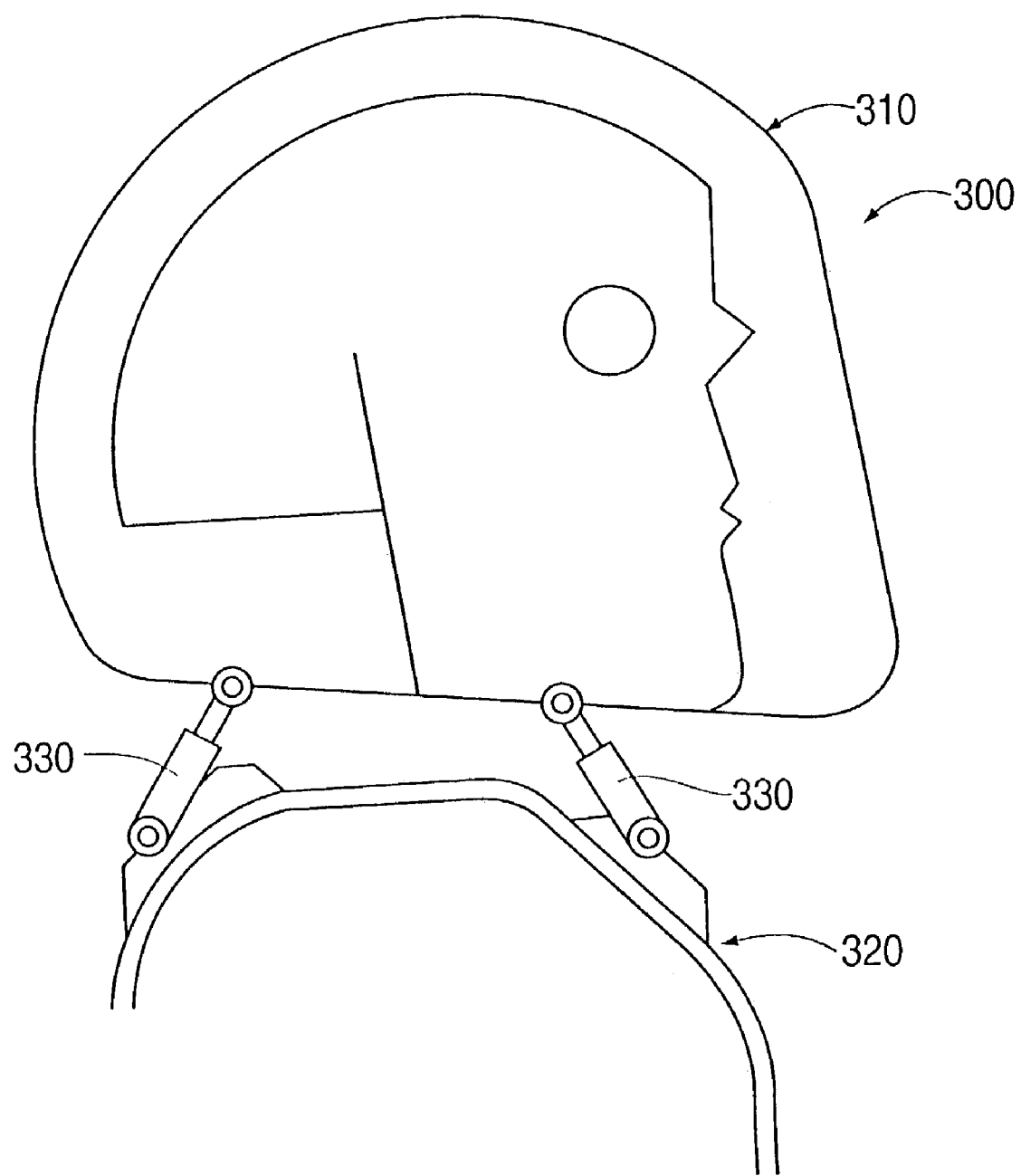
FIG. 8 is a side view of an automatic head stabilizing system according to one aspect of the present invention.

As embodied herein and shown in FIG. 8, helmet 310 and connection structure 320 are similar to those previously discussed with respect to FIGS. 1A–1C, 2A–2B, 5A and 5B. The connection structure may comprise a shoulder/chest plate 320 or a portion of the vehicle, such as safety harness. At least one MR fluid-based dashpot 330 is provided. Lord Corporation manufactures a presently preferred MR fluid that is used in the automatic dashpot of the present invention. Detailed function and structure of MR fluid-based dashpots may be located on the Lord Corporation website www.rheonetic.com.

According to one aspect of the invention, the system 300 includes means for monitoring the status of the vehicle and/or driver of the vehicle. The status of the driver of the vehicle may be monitored, for example, by use of an accelerometer on the helmet 310. A baseline acceleration can be established by driving around the track/course, and whenever acceleration of the head exceeds the predetermined baseline value, the system can initiate the reaction necessary to generate an offsetting reaction force.

The status of the vehicle itself may be monitored, for example, by use of a yaw sensor. Testing has shown that a crash can be anticipated by use of a yaw sensor in a vehicle. Most vehicles begin to turn sideways before a crash. By determining a baseline yaw reading, and then continuously monitoring the yaw sensor, once the sensor detects a change of yaw beyond a predetermined baseline value, the present system can initiate the reaction necessary to generate an offsetting reaction force before the crash occurs. Alternatively, a GPS system may be used to monitor the status of the vehicle.

By continuously sensing the status of the vehicle and/or driver, it is possible to continuously change the viscosity of the MR fluid in response to either a changing load on the head (accelerometer) or changing yaw of the vehicle (yaw sensor). Thus, at any given time, the dashpot is adjusted for the real-time status of the vehicle and/or driver.

In use, the head and body of the wearer are moving at the same velocity within the vehicle and little force/load is applied to the wearer's head. During high acceleration periods, such as when taking corners, the load on the wearer's head and neck increases. The load on the head and neck increases dramatically during a crash situation. The load on the head and neck may be monitored, for example, by an accelerometer that transmits the information to a system for applying a magnetic field to the MR fluid. Alternatively, in a more preferred embodiment, a yaw sensor is used to monitor the status of the vehicle, and when the status exceeds a predetermined baseline value, the system is triggered. The system for applying a magnetic field to the MR fluid adjusts the viscosity of the MR fluid based on the status information. The viscosity of the MR fluid is adjusted such that the dashpots become sufficiently rigid to generate a reaction force stabilizing the head and preventing any substantial increase or decrease in distance between the head and the body.

Figure 9:
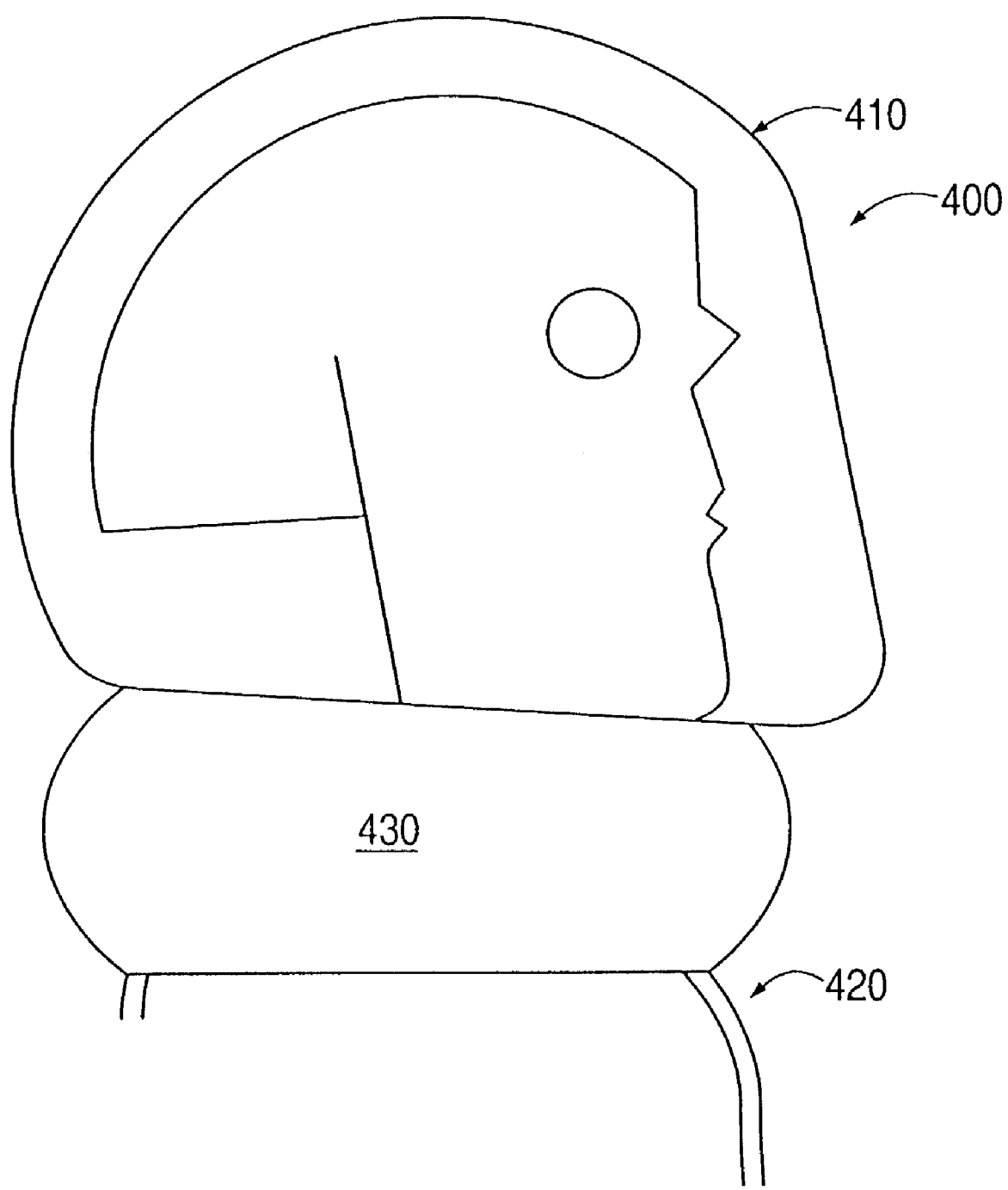
FIG. 9 is a side view of another embodiment of an automatic head stabilizing system according to another aspect of the present invention.

According to another aspect of the invention, a head stabilizing system for protecting the head and neck of a user during rapid deceleration may not include a MR fluid-based dashpot. As embodied herein and shown in FIG. 9, s system 400 includes a helmet 410 and a neck bladder 430. Optionally, the system 400 may be provided with a connection structure 420.

The bladder 430 may comprise a rubber inner tube or other hollow tubular inflatable member. Bladder 430 contains MR fluid and a coil (not shown) for applying a magnetic field to the MR fluid. As previously described, the status of the vehicle and/or driver is continuously monitored, for example by an accelerometer or a yaw sensor. This information is supplied to a control circuit that determines what the viscosity of the MR fluid should be in order to counteract the load on the head. The control circuit then supplies a current (calculated to provide the desired viscosity) to the coil, thereby changing the viscosity of the MR fluid.

The bladder 430 may be connected to either or both the helmet 410 and the chest/shoulder plate 420 and when sufficiently rigid (based upon the viscosity of the MR fluid), the bladder 430 will prevent motion/acceleration of the head and helmet 410 with respect to the body of the wearer (and connection structure, if provided). Alternatively, the bladder 430 may be structured such that physical connections are unnecessary. In such an embodiment, a chest/shoulder plate may not be provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A passive head stabilizing system for limiting the load acting on a wearer's head and generated by displacement, velocity, or acceleration of the wearer's head with respect to the wearer's body, comprising:
a passive resisting member having first and second ends, at least the first end being configured to be pivotably connected to another structure;
a helmet mount connector configured to pivotably connect the passive resisting member to a helmet, the helmet mount connector being pivotably connected to the first end of the passive resisting member; and
a harness connector configured to engage at least a portion of a safety harness of a vehicle and movable relative to the safety harness while engaging the harness, the harness connector being connected to the second end of the passive resisting member.

2. The system of claim 1, wherein the passive resisting member is a dashpot.

3. The system of claim 1, wherein the passive resisting member is a tether.

4. The system of claim 1, further comprising a helmet having a mounting device connectable to the helmet mount connector.

5. The system of claim 1, wherein the harness connector includes a roller configured to roll on the safety harness to permit the harness connector to move relative to the safety harness while engaging the safety harness.

6. The system of claim 1, wherein the harness connector includes an element configured to slide on the safety harness between a wearer and the harness to permit the harness connector to move relative to the safety harness while engaging the safety harness.

7. The system of claim 6, further comprising a second passive resisting member, wherein the harness connector includes means for connecting to an end of the second passive resisting member.

8. The system of claim 1, wherein the passive resisting member generates a reaction force that substantially opposes a crash impact force to yield a reduced net force on the head.

9. The system of claim 8, wherein the reaction force generated by the passive resisting member includes a vertical component.

10. The system of claim 8, wherein the reaction force generated by the passive resisting member includes a horizontal component.

11. The system of claim 8, wherein the reaction force generated by the passive resisting member includes a vertical component and a horizontal component.

12. The system of claim 8, wherein the passive resisting member is positioned to generate the reaction force that substantially opposes the crash impact force to yield the reduced net force on the head at a point below a center of gravity of the head.

13. The system of claim 1, wherein the helmet mount connector for connecting the passive resisting member to the helmet is attached to the helmet at a point below a center of gravity of the head.

14. A passive head stabilizing system for limiting the load acting on a wearer's head and generated by displacement, velocity, or acceleration of the wearer's head with respect to the wearer's body, comprising:
  a helmet; and
  passive means for generating a reaction force that substantially opposes a crash impact force to yield a reduced net force on the head, the passive means including at least one passive resisting member having a body portion, a first connecting portion, and a second connecting portion:
  wherein the body portion is positioned between the first and second connecting portions and the first connecting portion includes a pivoting mechanism and the second connecting portion is configured to connect to a safety harness and includes an element configured to be positioned between the safety harness and the wearer so as to engage a surface of the safety harness.

15. The system of claim 14, wherein the at least one passive resisting member includes at least one passive dashpot.

16. The system of claim 14, wherein the at least one passive resisting member includes at least one tether.

17. The system of claim 14, wherein the reaction force generated by the passive means includes a vertical component.

18. The system of claim 14, wherein the reaction force generated by the passive means includes a horizontal component.

19. The system of claim 14, wherein the reaction force generated by the passive means includes a vertical component and a horizontal component.

20. The system of claim 14, wherein the passive means is positioned to generate the reaction force that substantially opposes the crash impact force to yield the reduced net force on the head at a point below a center of gravity of the head.

21. The system of claim 14, wherein the at least one passive resisting member is connected to the helmet at a point below a center of gravity of the head.

* * * * *